United States Patent
Shenoi

(10) Patent No.: US 7,366,286 B1
(45) Date of Patent: Apr. 29, 2008

(54) MODIFIED ASYMMETRIC DIGITAL SUBSCRIBER LINE FOR USE WITH LONG LOOPS

(75) Inventor: Kishan Shenoi, Saratoga, CA (US)

(73) Assignee: Symmetricom, Inc, San Jose, CA (US)

( * ) Notice: Subject to any disclaimer, the term of this patent is extended or adjusted under 35 U.S.C. 154(b) by 997 days.

(21) Appl. No.: 10/324,912

(22) Filed: Dec. 20, 2002

Related U.S. Application Data

(60) Provisional application No. 60/342,683, filed on Dec. 21, 2001.

(51) Int. Cl.
*H04M 11/00* (2006.01)
(52) U.S. Cl. .................... 379/93.08; 379/93.01
(58) Field of Classification Search ............ 379/93.08, 379/93.28, 93.31; 375/222
See application file for complete search history.

(56) References Cited

U.S. PATENT DOCUMENTS

| | | | |
|---|---|---|---|
| 6,333,920 B1 * | 12/2001 | Nguyen et al. | 370/281 |
| 6,452,987 B1 * | 9/2002 | Larsson et al. | 375/222 |
| 6,895,041 B1 * | 5/2005 | Mccullough et al. | 375/222 |
| 2002/0163695 A1 * | 11/2002 | Unitt et al. | 359/137 |

* cited by examiner

*Primary Examiner*—Stella Woo
(74) *Attorney, Agent, or Firm*—Patterson & Sheridan LLP

(57) ABSTRACT

Systems and methods are described for modified asymmetric digital subscriber line for use with long loops. A method includes modifying a digital signal processor including reallocating a portion of an original guard band to a modified downstream band and reallocating a portion of an original upstream band to a modified guard band. An apparatus includes a digital signal processor defining an expanded downstream band; and a high pass filter coupled to the digital signal processor to accommodate the expanded downstream band.

36 Claims, 1 Drawing Sheet

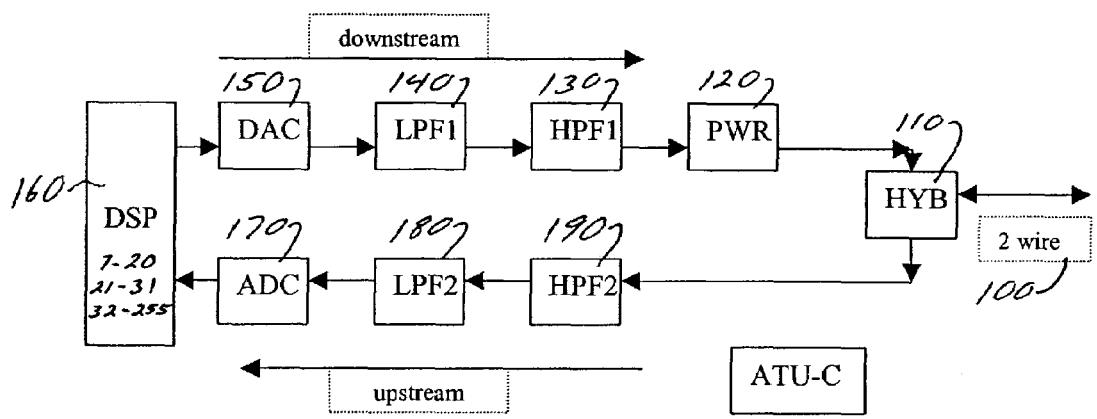
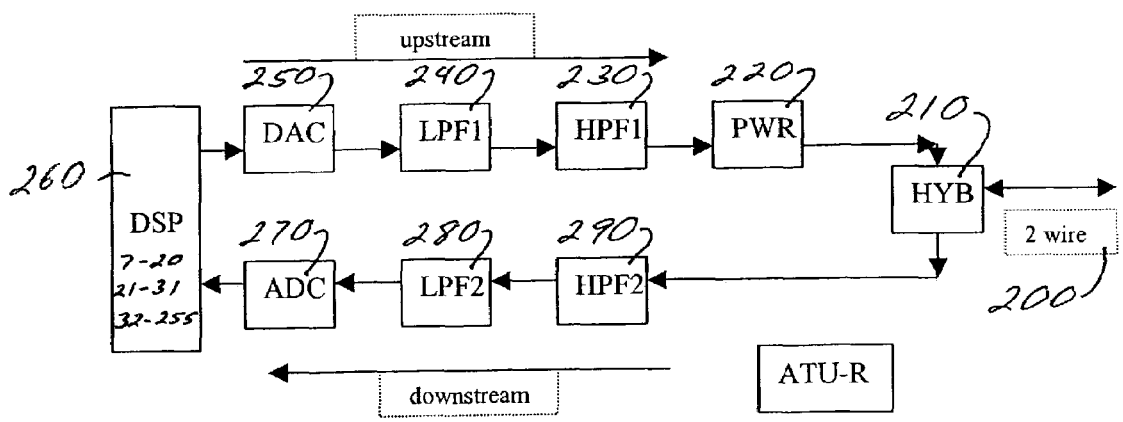

MODIFIED ASYMMETRIC DIGITAL SUBSCRIBER LINE FOR USE WITH LONG LOOPS

CROSS-REFERENCE TO RELATED APPLICATION

This application is related to and claims a benefit of priority under 35 U.S.C. 119(e) from U.S. Ser. No. 60/342,683, filed Dec. 21, 2001, the entire contents of which are hereby expressly incorporated herein by reference for all purposes.

BACKGROUND OF THE INVENTION

1. Field of the Invention

The invention relates generally to the field of data networking. More particularly, the invention relates to asymmetric digital subscriber line technology.

2. Discussion of the Related Art

With the explosive growth of the public internet, there has been an increasing demand for subscribers to have high-speed connectivity into the public network. Such broadband access mechanisms include cable modems and digital subscriber line (DSL) technology.

The accepted standard for asynchronous digital subscriber line (ADSL) specifies the use of DMT (Discrete Multi-Tone) for the encoding process and the predominant mode of operation is the FDD (Frequency Division Duplex) mode wherein the frequency range below 130 kHz is allocated for upstream data traffic (customer premise to Network) transmission and the frequency band from 130 kHz to 1.1 MHz is allocated for downstream data traffic (Network to customer premise). Considering that subscriber loop cable is lossy and acts like a low-pass filter, the higher frequency bands experience significant attenuation. This attenuation increases with distance. As a consequence, on short loops, ADSL technology is capable of supporting of the order of 8 Mbps downstream and 800 kbps upstream. As the loop length is increased, the supportable bit-rate decreases, with the impact on the downstream bit-rate more dramatic than on the upstream bit-rate. Therefore, what is needed is an approach that reduces the affect of loop cable attenuation on bit-rate, especially downstream bit-rate.

In addition, for loops in excess of about 18 kft (typically, loop length is considered in terms of 26 AWG cable or equivalent), ADSL cannot be supported without additional equipment (Extenders) deployed in the cable plant. Therefore, what is also needed is an approach that helps to support ADSL on longer loops without deploying additional equipment in the cable plant.

Based on information made available by Service Providers, such as SBC, there are a significant number of "problem" loops in the 12 kft to 18 kft (26-AWG EWL) range. These loops are a problem because of bridged taps and/or additive noise. The model for the additive noise problem is additive white noise of between −130 dBm/Hz and −120 dBm/Hz (compared to the "usual" assumption of additive noise of approximately −140 dBm/Hz).

The service rates tariffed (proposed and/or provided) by phone companies are quite modest. At 12 kft the phone companies want to guarantee 1.5 M/128 k; at 14 kft the required rate drops to 384 k/128 k; and beyond that is "better than currently available".

It is evident that the problems are related more to downstream capacity than upstream. Since FDD-mode DMT-ADSL uses the higher frequency band for downstream, the natural low-pass nature of subscriber loop cable introduces significantly greater attenuation for the downstream band than upstream. The lossy nature of subscriber cable indicates that bridged taps are appropriately modeled as shunt capacitors, causing a further attenuation of the downstream band (especially at the higher frequencies). The additive white noise impacts the downstream to a much higher degree than the upstream because of the (high-frequency) attenuation suffered by the signal.

One approach that has been proposed the is the use of "power boost" in the DSLAM (Digital Subscriber Line Access Multiplexer, which houses the ATU-C). The intent is to "burn through the clutter", a phrase drawn from radar in the presence of jamming. However, the potential issues of spectral mask violations and spectral compatibility must be considered and may indeed make this approach not viable. That notwithstanding, such an approach is operationally attractive since the infrastructure is not modified, the operational issues of additional network elements is moot, and it is a "simple" matter of using different plugs in existing DSLAMs.

Another approach suggested has been to deploy additional equipment in the Central Office and the customer premise located NID (Network Interface Device; a box placed at the customer site, usually outside the building that provides a demarcation point between the Telephone Company owned subscriber loop and the customer owned inside-the-building wiring. High voltage protection is included in the NID). The CO unit would interface with the DSLAM (for ADSL) and the Class-5 Telephone Switch (for POTS); the two forms of traffic would be combined and encoded digitally onto the subscriber loop using modulation techniques like that used for G.shdsl. There would be circuitry in the NID to do the splitting of POTS and ADSL. This is an expensive way to solve the problem. Furthermore, This solution could well render the DSLAM (i.e. ADSL DSLAM) moot. The "ADSL" would exist just between the NID and the ATU-R at the CPE.

Heretofore, the requirements of reducing the affect of attenuation on the bit-rate, especially disproportionate attenuation impact on the downstream bit-rate, and avoiding the need to deploy additional equipment in the cable plant referred to above have not been fully met. What is needed is a solution that addresses these requirements.

SUMMARY OF THE INVENTION

There is a need for the following aspects of the invention. Of course, the invention is not limited to these aspects.

According to an aspect of the invention, a process comprises: modifying a digital signal processor including reallocating a portion of an original guard band to a modified downstream band and reallocating a portion of an original upstream band to a modified guard band. According to another aspect of the invention, a machine comprises: a digital signal processor defining an expanded downstream band; and a high pass filter coupled to the digital signal processor to accommodate the expanded downstream band.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 1 illustrates a block diagram of a relevant portion of an ADSL transmission unit-central (ATU-C), representing an embodiment of the invention.

FIG. 2 illustrates a block diagram of a relevant portion of an ADSL transmission unit remote (ATU-R), representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced U.S. Patent Applications disclose embodiments that are satisfactory for the purposes for which they are intended. A discussion of asymmetric digital subscriber line (ADSL), the problem of long reach, and the use of extenders, is available in the following documents that are incorporated by reference.

The entire contents of: {1} U.S. Utility Patent Application entitled "Digital Subscriber Line Repeaters and Associated Methods" U.S. Ser. No. 09/476,770, filed Jan. 3, 2000 (and also PCT/US00/35714, filed Dec. 28, 2000); {2} U.S. Provisional Patent Application entitled "Asymmetric Digital Subscriber Line Methods Suitable for Long Subscriber Loops" U.S. Ser. No. 60/193,061, filed Mar. 29, 2000 U.S. Utility Patent Application entitled "Asymmetric Digital Subscriber Line Methods Suitable for Long Subscriber Loops" U.S. Ser. No. 09/821,841, filed Mar. 28, 2001 (and also PCT/US01/10734, filed Mar. 29, 2001); {3} U.S. Provisional Patent Application entitled "Asymmetric Digital Subscriber Line Method Suitable for Long Subscriber Loops Using Automatic Gain Control" U.S. Ser. No. 60/199,930, filed Apr. 26, 2000 U.S. Utility Patent Application entitled "Asymmetric Digital Subscriber Line Method Suitable for Long Subscriber Loops Using Automatic Gain Control" U.S. Ser. No. 09/843,161, filed Apr. 25, 2001 (and also PCT/US01/40623, filed Apr. 26, 2001); and {4} U.S. Provisional Patent Application entitled "Download Booster for Asymmetric Digital Subscriber Line Transmission" U.S. Ser. No. 60/301,584, filed Jun. 27, 2001; U.S. Utility Patent Application entitled "Download Booster for Asymmetric Digital Subscriber Line Transmission" U.S. Ser. No. 10/140,611, filed May 7, 2001 (and also PCT/US02/19754, filed Jun. 21, 2001) are hereby expressly incorporated by reference herein for all purposes.

Whereas repeaters (and extenders) (see references {1} and {3}, above) require the deployment of equipment "midspan" (i.e. in the outside plant), reference {2} addresses a method that affects just the end-point devices, for example modems such as the ADSL transmission unit-central (ATU-C) at the Central Office (CO) and the ADSL transmission unit-remote (ATU-R) at the remote site (e.g., customer premise). The invention disclosed herein also addresses a method that affects only the end-points. Reference {4} addresses a method that affects just the ATU-R and can be incorporated in conjunction with the invention disclosed herein.

The invention discussed here pertains to DSL and, in particular, ADSL (Asymmetric Digital Subscriber Line) technology which is the predominant method provided by Telephone Companies for their customers and is provided over the conventional twisted-pair subscriber loop arrangement that has supported POTS (Plain Old Telephone Service). The context of the invention can include frequency division duplex mode discrete multi-tone asynchronous digital subscriber line.

The invention can include chip set (e.g., digital signal processor on a single chip) bin reallocation to increase the data capacity of a downstream band and/or the width of a guard band, albeit at the cost of reduced data capacity in an upstream band. The invention can include modifying associated high pass and/or low pass filters to accommodate the reallocated band widths.

All available ADSL chip-sets are geared for FDD-mode DMT-ADSL. In particular, the bins from $i=7$ through $i=29$ are used for upstream and the bins from $i=38$ through $i=255$ are used for downstream. (In DMT, the multiple carriers are spaced 4.3125 kHz apart and are numbered from 0 through 255; we refer to these sub-channels as "bins"). That is, the frequency band between 30 kHz to 125 kHz (approximately) is used for upstream and the frequency band between 163 kHz to 1.1 MHz (approximately) is used for downstream.

Using commercially available test sets, such as those from Sunrise Telecom (which use the Alcatel chip-set) the following experiment was conducted. With 18 kft of simulated cable (no noise, no bridged taps) the synch-up upstream bit-rate was 256 kbps (>6 dB margin); restricting the upstream to bins from $i=7$ through $i=20$, the upstream bit-rate dropped to 160 kbps. Conventional implementations of ADSL do not provide flexibility in the choice of downstream bins (except to turn them off). The downstream rate was about 512 kbps. {For reference: with modified upstream bins, at 15 kft the rates are 1660/320 kbps; at 14 kft the rates are 2200/352; at 12 kft the rates are 3800/416 (simulator, no noise, no bridged taps)}.

All currently commercially available ADSL chip-set are geared for the choice of bins from $i=38$ through $i=255$ for the downstream. The invention can include modifying the chip-set to alter the choice of downstream bins to $i=32$ through $i=255$. (And the choice of upstream bins to $i=7$ through $i=~20$). More generically, the invention can include selecting a lower end point of the downstream band to be i=37, i=36, i=35, i=34, i=33, preferably i=32.

All ADSL chip-sets are DSP based (based on techniques of Digital Signal Processing and use Digital Signal Processors). They are essentially special-purpose DSP chips (processors) that execute the code for the various algorithms. The DMT-ADSL standard restricts the choice of downstream bins to i=32 through i=255 with the lower end being a vendor choice (all chip-set vendors have chosen 38). Like-wise, the DMT-ADSL standard restricts choice of upstream bins to i=0 through i=31, with both ends being a vendor choice (and most have chosen 7 and 29). That is, the standard specifies 130 kHz as the cross-over point between upstream and downstream and provides vendors the flexibility of choosing an appropriate "guard band". It is highly unlikely that any chip designers chose to restrict the bin usage in hardware, especially considering that the part is generally a programmable device. It is possible that the code is in masked-ROM (Read-Only-Memory) in the part (essentially hard-wired). Changing this program is possible though it may take a re-spin in the case of a masked-ROM device. However, it has been found that most parts use RAM (Random Access Memory, i.e. read/write) to store the code that is downloaded at power-up (or reset).

Considering that the upstream bit-rate is not an issue, altering the choice of upstream and downstream frequency bands represents a sensible trade-off between upstream and downstream bit rates.

The nominal guard band is between i=30 through i=37; with the modified choice, the guard band changes to between i=21 through i=31, providing, it turns out, a wider guard band. The key is that the spectrum added to the downstream (at the expense of upstream) is at the lower end of the frequency band where bridged taps and cable attenuation have less of an impact. This is prime spectrum where the attenuation is less than at any other part of the downstream frequency band.

Implementation of this method may require a modification to the DSLAM plug and ATU-R manufacturers would use the modified chip-sets (or the modified downloadable code) to develop the modified ATU-R. The modifications required are discussed later.

Note that, in a somewhat contorted manner, making this alteration in downstream bandwidth does appear as a "power boost". The power "boost" is achieved by increasing the bandwidth rather than by increasing the power spectral density (which would correspond to straight amplification of the signal).

This method provides the solution to two problems encountered by the Telephone Company. The first is to provide reliable ADSL service on loops in the 12 kft to 18 kft range. The second is a solution to the 9 kft to 12 kft 6-Mbps problem wherein 6 Mbps can be provided up to 9 kft but problem loops in the 9 kft to 12 kft range are commonplace precluding the provision of 6 Mbps service.

Modifications Required:

Chip-set manufacturers can easily modify their chip-sets (downloadable code) to implement the change in bin-choice for upstream and downstream.

Other necessary modifications are discussed next. In FIG. 1 we show an ADSL transmission unit-central (ATU-C) and use that as the basis to indicate what modifications are necessary.

Referring to FIG. 1, a block diagram of a relevant portion of an ATU-C is depicted. A 2 wire link 100 to a subscriber loop (not shown) is coupled to a 2-wire to 4-wire converter 110 (HYB). The 2-wire-to-4-wire converter 110 is coupled to power stage 120 (PWR). The power stage 120 is coupled to a first high pass filter 130 (HPF1). The first high pass filter 130 is coupled to a first low pass filter 140 (LPF1). The first low pass filter 140 is coupled to a digital to analog converter 150 (DAC). The digital to analog converter 150 is coupled to a digital signal processor 160 (DSP). In this embodiment, the digital signal processor 160 has been modified by assigning chip set bins 7 through 20 to a upstream band, bins 21-31 to a guard band, and bins 32-255 to a downstream band. Of course, the invention is not limited to these particular reallocations. The digital signal processor is also coupled to an analog to digital to analog converter 170 (ADC). The digital to analog converter is coupled to a second low pass filter 180 (LPF2). The second low pass filter 180 is coupled to a second high pass filter 190 (HPF2). The second high pass filter 190 is also coupled to the 2-to-4-wire converter 110.

The downstream (digital) signal is converted to analog via the DAC. Typically, the sampling rate is 2.2 MHz. The low-pass filter LPF1 removes the spectral replicates associated with the conversion process. HPF1 is a high-pass filter that defines the lower end of the downstream spectral occupancy. The nominal cross-over between pass-band and stop-band is 130 kHz. In practice, however, the pass-band edge appears to be somewhat higher than 160 kHz. The reason for this observation is that when we look at the "bits-per-carrier" we see that there is an increase in the bits-per-carrier from bin i=38 to (about) bin i=60 and that this difference can be as much as 6 to 8 bits (depending on the length of the loop used). The only logical explanation for this is that the high-pass filter(s) (could be in either the ATU-R or ATU-C) in the downstream path do not reach true pass-band flatness till about 250 kHz. A power stage ("PWR") drives the line through a 2-wire-to-4-wire converter ("HYB").

In the upstream direction, the incoming signal on the 2 wire subscriber loop is coupled to a high-pass filter (HPF2) which cleans out the POTS band, essentially all frequency components below about 30 kHz. LPF2 is an anti-aliasing filter that is required for the analog-to-digital conversion (in the "ADC") to function properly. Typically, the pass-band edge of LPF2 need extend only through the upstream frequency band.

The modifications required in the ATU-C:
a) Change choice of upstream and downstream bin ranges.
b) Modify HPF1 to ensure that the downstream pass-band extends down to 136 kHz (the lower edge of the bin corresponding to I=32). The stop-band edge must be greater than 88 kHz (the upper edge of the bin corresponding to I=20). This is achievable by using different component values and should not need a re-layout of the card.
c) Optionally, modify LPF2 so that its pass-band extends only up to 88 kHz. Again, this should be achievable via component value changes only.

The ATU-R modifications are discussed next. In FIG. 2 we show an ADSL transmission unit-remote (ATU-R) and use that as the basis to indicate what modifications are necessary.

Referring to FIG. 2, a block diagram of a relevant portion of an ATU-R is depicted. A 2 wire link 200 to a subscriber loop (not shown) is coupled to a 2-wire to 4-wire converter 210 (HYB). The 2-wire-to-4-wire converter 210 is coupled to power stage 220 (PWR). The power stage 220 is coupled to a first high pass filter 230 (HPF1). The first high pass filter 230 is coupled to a first low pass filter 240 (LPF1). The first low pass filter 240 is coupled to a digital to analog converter 250 (DAC). The digital to analog converter 250 is coupled to a digital signal processor 260 (DSP). In this particular embodiment, the digital signal processor 260 has been modified by assigning chip set bins 7 through 20 to a upstream band, bins 21-31 to a guard band, and bins 32-255 to a downstream band. Again, the invention is not limited to these particular reallocations. The digital signal processor 260 is also coupled to an analog to digital to analog converter 270 (ADC). The digital to analog converter is coupled to a second low pass filter 280 (LPF2). The second low pass filter 280 is coupled to a second high pass filter 290 (HPF2). The second high pass filter 290 is also coupled to the 2-to-4-wire converter 210.

The upstream (digital) signal is converted to analog via the DAC. The low-pass filter LPF1 removes the spectral replicates associated with the conversion process. HPF1 is a high-pass filter that defines the lower end of the upstream spectral occupancy, typically 30 kHz. A power stage ("PWR") drives the line through a 2-wire-to-4-wire converter ("HYB").

In the downstream direction, the incoming signal on the 2 wire subscriber loop is coupled to a high-pass filter (HPF2) which cleans out the upstream (and POTS), essentially removing all frequency components below about 130 kHz. In practice, however, the pass-band edge appears to be somewhat higher than 160 kHz. The reason for this observation is that when we look at the "bits-per-carrier" we see that there is an increase in the bits-per-carrier from bin I=38 to (about) bin I=60 and that this difference can be as much as 6 to 8 bits (depending on the length of the loop used). The only logical explanation for this is that the high-pass filter(s) (could be in either the ATU-R or ATU-C) in the downstream path do not reach true pass-band flatness till about 250 kHz. LPF2 is an anti-aliasing filter that is required for the analog-to-digital conversion (in the "ADC") to function properly. Typically, the sampling rate of the ADC is 2.2 MHz.

The modifications required in the ATU-R:
a) Change choice of upstream and downstream bin ranges.
b) Modify HPF2 to ensure that the downstream pass-band extends down to 136 kHz (the lower edge of the bin corresponding to i=32). The stop-band edge must be greater than 88 kHz (the upper edge of the bin corresponding to i=20). This is achievable by using different component values and should not need a re-layout of the card.
c) Optionally, modify LPF1 so that its pass-band extends only up to 88 kHz. Again, this should be achievable via component value changes only.

One question that may be raised is what if a modified ATU-C (ATU-R) is connected to an unmodified ATU-R (ATU-C). Since in the training phase the modems negotiate the "common" parameters (i.e. choice of bins and bits/carrier), it is very likely that the downstream bit-rate will be the same as if both were unmodified. If the ATU-C modification included the alteration of LPF2, the upstream bit-rate will be lower. Nevertheless, the communications link will function and the link can reach full data capacity as soon and the unmodified ATU-R (ATU-C) can be modified, for example by a (power-down) reset.

It is well known that the multi-carrier modulation scheme used in ADSL is close to optimal in terms of bps/Hz efficiency. The advantage that TC-PAM (the G.shdsl standard, and the method proposed for recoding the loop) has over DMT is that DMT is commonly used in the FDD mode and thus about 160 kHz of prime spectrum is unavailable for the downstream. TC-PAM implementations use echo-canceling to allow the downstream to operate down to direct current.

The reduction in mid-band capacity with increased attenuation indicates that the ATU-R has a significant "noise floor", primarily attributable to A/D quantization noise. That is, the A/D converter is the culprit in reducing aggregate bit-rate capacity. Given this is true, the download booster approach described in U.S. Provisional Patent Application entitled "Download Booster for Asymmetric Digital Subscriber Line Transmission" U.S. Ser. No. 60/301,584, filed Jun. 27, 2001; and U.S. Utility Patent Application entitled "Download Booster for Asymmetric Digital Subscriber Line Transmission" U.S. Ser. No. 10/140,611, filed May 7, 2001 (and also PCT/US02/19754, filed Jun. 21, 2001) should work well in combination with the invention disclose herein. In summary, there is adequate evidence that the proposed solution is workable.

A simple experiment was conducted to demonstrate evidence that the proposed solution is feasible. The set up included DLS line simulators (from Spirent Corp.) and Sunrise Telecom test sets (which use Alcatel chip-sets). The upstream bin-choice was limited to i=20. The downstream choice was the default configuration (starting at i=38). Four configurations were considered. These are described in the four examples below.

Configuration 1 (no BT). 15 kft (8 kft+7 kft) of 26-AWG between the ATU-C and the ATU-R. The test sets synched up at 1632/288 kbps (greater than 6 dB margin). The bits/carrier for the upstream was roughly 7 (each). For the downstream, the bits/carrier are provided in the column labeled Configuration 1 in Table 1.

Configuration 2 (one BT). A 3 kft (24-AWG) bridged tap was applied at 8 kft from the ATU-C. The test sets synched up at 1312/224 kbps and the average bits/carrier in the upstream was about 6. For the downstream, the bits/carrier are provided in the column labeled Configuration 2 of Table 1.

Configuration 3 (two BT). An additional bridged tap of 500 ft (24-AWG) was added at the ATU-C. The test sets synched up at 800/192 kbps and the average bits/carrier in the upstream was about 5.5. For the downstream, the bits/carrier are provided in the column labeled Configuration 3 in Table 1.

Configuration 4 (three BT). An additional bridged tap of 100 ft (24-AWG) was added at the ATU-R. The test sets synched up at 512/192 kbps and the average bits/carrier in the upstream was about 5.5. Once again, for the downstream, the bits/carrier are provided in the column labeled Configuration 4 in the subsequent table.

TABLE 1

| Carrier id | Configuration 1 | Configuration 2 | Configuration 3 | Configuration 4 |
| --- | --- | --- | --- | --- |
| i = 38 | 2 | 2 | 2 | 2 |
| i = 39 | 3 | 4 | 3 | 2 |
| i = 40 | 4 | 4 | 4 | 2 |
| i = 41 | 4 | 4 | 4 | 3 |
| i = 42 | 5 | 5 | 4 | 3 |
| i = 43 | 5 | 5 | 5 | 4 |
| i = 44 | 5 | 6 | 5 | 4 |
| i = 45 | 6 | 6 | 5 | 4 |
| i = 46 | 6 | 6 | 5 | 4 |

TABLE 1-continued

| Carrier id | Configuration 1 | Configuration 2 | Configuration 3 | Configuration 4 |
|---|---|---|---|---|
| i = 51 | 7 | 7 | 5 | 4 |
| i = 56 | 8 | 7 | 4 | 4 |
| i = 81 | 6 | 5 | 2 | 2 |
| i = 91 | 5 | 5 | 4 | 2 |
| i = 101 | 4 | 3 | 2 | 2 |
| Last non-zero | i = 136 | i = 116 | I = 111 | i = 106 |

Whereas the experiment may not be repeatable in the strictest sense, the patterns are evident and repeatable. The non-repeatability is because there will always be some minor variations between equipment used and, more importantly, the circuitry in the test sets is definitely of higher quality than the circuitry used in (commodity) modems.

It can be appreciated from Table 1 that there is a definite pattern associated with increasing bridged taps. The "capacitive" (i.e. low-pass) impact of bridged taps is evident from the last row which provides an indication of the highest frequency bin utilized for transporting data.

There is a distinctive increase in bin capacity from small (2 bits/carrier at i=38) to a "mid-band" value, where the bin capacity is at its largest, followed by a decrease in capacity at higher frequencies. The low-pass nature of the bridged taps extends to reasonably low frequencies as is evidenced by the drop off of mid-band bin capacity with increasing bridged taps. The mid-band bin capacity drops from 8 bits/carrier for configuration 1 to 7 bits for configuration 2, and then to 5 bits and 4 bits for configurations 3 and 4, respectively.

For configurations 1, 2, and 3, the bin capacities for the lower frequencies (i=38 through about i=43), the bin capacities are about the same. This is clear evidence that the capacity of a low frequency bin is determined by the high-pass filters in the ATU-C and ATU-R.

By using higher quality high-pass filters and ensuring that the pass-band truly extends down to i=38, improved performance can be achieved. In fact, if the mid-band value extends all the way down to i=38, then an improvement of about 160 kbps for aggregate downstream bit-rate can be achieved in configuration 1. The improvement is about 32 kbps in the case of configuration 4.

The increased downstream bit-rate achievable by extending the lower edge of the downstream band to i=32 can be estimated. To a first approximation, we can assume that the pattern of increase in bin capacity remains the same (still sloppy high-pass filters) but starts earlier and thus has additional bins in the mid-band region. The 6 additional bins provide as much as 192 kbps additional (configuration 1) or 96 kbps additional (configuration 4). Most importantly, this increase is an unexpected significant improvement in performance results that is greater than what would be provided a mere linear addition of 6 bins to an existing 218 bins (namely ((224/218)*100)−100 or 2.75%). Moreover, this unexpected significant improvement actually becomes more significant as the number of problematic legacy taps increases in a given loop. This increase should be adequate in converting a "problem loop" into a "serviceable loop".

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

While not being limited to any particular performance indicator or diagnostic identifier, preferred embodiments of the invention can be identified one at a time by testing for the minimum residual guard band that preserves data integrity. The test for the minimum residual guard band that preserves data integrity can be carried out without undue experimentation by the use of a simple and conventional bit error checking experiment.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

ADVANTAGES OF THE INVENTION

An end point device including a modem such as an ATU-C and/or AUT-R, representing an embodiment of the invention, can be cost effective and advantageous for at least the following reasons. The invention can help to reduce the disproportionate affect of attenuation on the downstream bit-rate. The invention can help to avoid the need to deploy extenders in the cable plant. The improvement in data rate provided by the invention actually becomes more significant in the context of loops that contain more legacy taps. The invention can improve quality and/or reduce costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the digital signal processor described herein can be a separate module, it will be manifest that the digital signal processor may be integrated into the system with which it is (they are) associated. Similarly, although the high pass filter (and low pass filter) described herein can be separate module(s), it will be manifest that the high pass filter (and low pass filter) may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method of modifying a digital signal processor for an asymmetric digital subscriber line transmission unit, that is configured with an original upstream band, an original guard band, and an original downstream band, in accordance with an increase in reach, said method comprising the steps of:
    allocating an upstream band that is narrower than the original upstream band;
    allocating a guard band having a range of frequencies that is shifted relative to the a range of frequencies of the original guard band; and
    allocating a downstream band that is wider than the original downstream band.

2. The method of claim 1, further comprising modifying a high pass filter that is coupled to the digital signal processor to accommodate the modified downstream band.

3. The method of claim 2, further comprising modifying a low pass filter that is coupled to the digital signal processor to accommodate the modified guard band.

4. The method of claim 3, wherein the high pass filter is coupled to a downstream output of the digital signal processor and the low pass filter is coupled to an upstream input of the digital signal processor.

5. The method of claim 3, wherein the high pass filter is coupled to an upstream input of the digital signal processor and the low pass filter is coupled to a downstream output of the digital signal processor.

6. The method of claim 1, wherein a bandwidth of the modified guard band is wider than a bandwidth of the original guard band.

7. The method of claim 1, wherein the digital signal processor is coupled to a frequency division duplex mode discrete multi-tone asynchronous digital subscriber line.

8. The method of claim 7, wherein the upstream band is defined by bins 7 through 20 of the digital signal processor, the guard band by bins 21 through 31 of the digital signal processor and the downstream band by bins 32 through 255 of the digital signal processor.

9. The method of claim 1, wherein the step of allocating includes writing a random access memory with a downloaded code.

10. The method of claim 9, wherein writing occurs during resetting of the random access memory.

11. The method of claim 1, wherein the step of allocating includes writing an erasable programmable read only memory with a downloaded code.

12. The method of claim 1, wherein the step of allocating includes replacing a read only memory.

13. A computer program, comprising computer or machine readable program elements translatable for implementing the method of claim 1.

14. An apparatus for performing the method of claim 1.

15. An electronic media, comprising a program for performing the method of claim 1.

16. An apparatus, comprising the electronic media of claim 15.

17. A process, comprising utilizing the apparatus of claim 16.

18. The method of claim 1, wherein a low frequency endpoint of the modified upstream band is the same as a low frequency endpoint of the original upstream band.

19. The method of claim 18, wherein a low frequency endpoint of the modified downstream band is lower than a low frequency endpoint of the original downstream band.

20. The method of claim 19, wherein a high frequency endpoint of the modified downstream band is the same as a high frequency endpoint of the original downstream band.

21. An asymmetric digital subscriber line transmission unit, comprising:
    a digital signal processor configured for long reach applications, wherein an upstream band defined by the digital signal processor is narrower than an upstream band defined by a digital signal processor configured for short reach applications, and a guard band defined by the digital signal processor is wider than a guard band defined by the digital signal processor configured for short reach applications, and a downstream band defined by the digital signal processor is wider than an downstream band defined by the digital signal processor configured for short reach applications.

22. The asymmetric digital subscriber line transmission unit of claim 21, wherein the downstream band defines a low frequency endpoint of from approximately 130 kHz to approximately 163 kHz.

23. The asymmetric digital subscriber line transmission unit of claim 22, wherein the low frequency endpoint is approximately 130 kHz.

24. The asymmetric digital subscriber line transmission unit of claim 23, wherein the digital signal processor and the high pass filter are located in a frequency division duplex mode discrete multi-tone asynchronous digital subscriber line modem.

25. The asymmetric digital subscriber line transmission unit of claim 24, further comprising another frequency division duplex mode discrete multi-tone asynchronous digital subscriber line modem.

26. The asymmetric digital subscriber line transmission unit of claim 21, further comprising a high pass filter that is coupled to a downstream output of the digital signal process and a low pass filter that is coupled to an upstream input of the digital signal processor.

27. The asymmetric digital subscriber line transmission unit of claim 21, wherein the high pass filter is coupled to an upstream input of the digital signal process and the low pass filter is coupled to a downstream output of the digital signal processor.

28. A method for transferring data which comprises utilizing the asymmetric digital subscriber line transmission unit of claim 21.

29. A circuit board, comprising the asymmetric digital subscriber line transmission unit of claim 21.

30. A modem, comprising the circuit board of claim 29.

31. A frequency division duplex mode discrete multi-tone asynchronous digital subscriber line network, comprising the modem of claim 30.

32. An electronic media, comprising computer or machine readable program elements translatable for implementing a method of modifying a digital signal processor for an asymmetric digital subscriber line transmission unit, that is configured with an original upstream band, an original guard band, and an original downstream band, wherein the method includes the steps of:
   allocating an upstream band that is narrower than the original upstream band;
   allocating a guard band having a range of frequencies that is shifted relative to the a range of frequencies of the original guard band; and
   allocating a downstream band that is wider than the original downstream band.

33. An apparatus, comprising the electronic media of claim 32.

34. A method, comprising deploying the electronic media of claim 32.

35. A kit, comprising computer or machine readable program elements translatable for implementing a method of modifying a digital signal processor for an asymmetric digital subscriber line transmission unit, that is configured with an original upstream band, an original guard band, and an original downstream band, wherein the method includes the steps of:
   allocating an upstream band that is narrower than the original upstream band;
   allocating a guard band having a range of frequencies that is shifted relative to the a range of frequencies of the original guard band; and
   allocating a downstream band that is wider than the original downstream band.

36. The kit of claim 35, further comprising instructions.

* * * * *